United States Patent
Phelps et al.

(12)

(10) Patent No.: US 6,512,611 B1
(45) Date of Patent: Jan. 28, 2003

(54) METHOD OF DEACTIVATING PROTECTION FIBER RESOURCES IN OPTICAL RING NETWORKS

(75) Inventors: Peter W. Phelps, Nepean (CA); Evert E. Deboer, Nepean (CA); Robert Caporuscio, Montreal (CA); Johnny Leung, Kirkland (CA); Paul Charron, St. Lambert (CA); Louis R. Pare, St. Bruno (CA); Joseph Olajubu, Essex (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/471,139

(22) Filed: Dec. 23, 1999

(51) Int. Cl.[7] ............................................. H04B 10/08
(52) U.S. Cl. .................................. 359/110; 359/119
(58) Field of Search ........................... 359/110, 119, 359/173

(56) References Cited

U.S. PATENT DOCUMENTS

| | | | | |
|---|---|---|---|---|
| 5,717,796 A | * | 2/1998 | Clendening | 359/119 |
| 5,903,370 A | * | 5/1999 | Johnson | 359/119 |
| 6,046,832 A | * | 4/2000 | Fishman | 359/119 |
| 6,052,210 A | * | 4/2000 | Nathan | 359/119 |
| 6,295,146 B1 | * | 9/2001 | Nathan et al. | 359/119 |
| 6,222,653 B1 | * | 4/2002 | Asahi | 359/110 |

* cited by examiner

Primary Examiner—Kinfe-Michael Negash

(57) ABSTRACT

The present invention consists of a method of deactivating protection fiber resources in an existing optical interconnected ring network or system. The invention uses 1:N protection principles to provide a single protection path on spans interconnecting nodes common to two or more optical rings. With the sharing of a protection fiber or channel on spans interconnecting common nodes, the present invention eliminates the need for multiple protection paths on these spans and provides substantial fiber capacity savings. According to the invention, the protection fibers and equipment deactivated can be removed or alternatively re-provisioned to provide a cost-effective and efficient allocation of the resources available in the network.

34 Claims, 2 Drawing Sheets

METHOD OF DEACTIVATING PROTECTION FIBER RESOURCES IN OPTICAL RING NETWORKS

FIELD OF THE INVENTION

This invention relates generally to optical ring networks and more particularly to a method of deactivating protection fiber resources in optical ring networks.

BACKGROUND ART

Today's optical transport networks employ a number of different topologies to satisfy increasing demands for network simplicity, cost containment, bandwidth efficiency and protection. Common network topologies include point-to-point terminal configurations, linear add/drop multiplexer configurations and ring configurations. Of all these different topologies, ring configurations are often the preferred network configuration for applications requiring high transport capacity.

In optical ring networks, the bandwidth available in each fiber interconnecting nodes can be allocated in various ways to meet different capacity demands. In some ring configurations, the bandwidth available for transport can be provisioned as a single optical transmission path. However, in the vast majority of ring configurations, the bandwidth is partitioned into channels or wavelengths to increase capacity.

In optical ring networks as in other optical configurations, it is common to use the term fiber generally to denote traffic carrying capacity. As such, in addition to denote physical fibers, the term fiber can also be used to denote single channels or wavelengths in a physical fiber. For clarity and unless stated otherwise, the term fiber as applied generally to optical networks is hereinafter used to denote both a physical fiber and a single channel or wavelength within a physical fiber.

In addition to providing large capacity, optical ring systems are also designed with redundant equipment to have other attributes such as, for example, bidirectionality and/or increased reliability to reduce service failures. In conventional unidirectional and bidirectional ring systems for example, multiple fibers are commonly installed to achieve transmit and receive operations. Additional fibers are also installed to "protect" the working fibers in the event of a link (span) failure. Current ring protection schemes include dedicated protection, 1 protection fiber for each fiber or 1:1 protection which can be used in both path switched and line switched configurations.

Because of the protection requirements that are necessary in a ring configuration, all spans in a ring are provisioned with at least one protection path. However, for some ring configurations, this requirement can lead to inefficiencies. In interconnected ring configurations for example, the interconnected rings must have distinct protection capabilities with at least one dedicated protection path for each span of each ring. On spans with interconnecting nodes common to two or more rings, this means that distinct protection paths must be provisioned which therefore necessitates dedicated protection fibers or channels for each ring. In applications with rapidly growing demands for ring interconnectivity, this protection usage is inefficient and can lead to considerable capital outlays, particularly on spans where a large number of rings must be accommodated.

In addition to this ineffective use of protection fibers or channels, the protection of multiple rings between nodes necessitates replicating some of the connection equipment required at each node. In interconnected ring systems such as described above, this would require duplicating some of the optics apparatus for each protection fiber or channel provisioned. Duplicating this equipment for each protection fiber/channel may also prove to have a considerable impact on the system cost.

Therefore, it would be desirable to use the existing protection capabilities more efficiently in interconnected ring configurations or alternatively deactivate redundant protection fiber resources so that they can be removed or re-provisioned for use in other network configurations.

SUMMARY OF THE INVENTION

The present invention consists of a method of deactivating protection fiber resources in an existing optical network having interconnected rings. The invention can be used in any optical network or system with a separate path for protected traffic whether it is a physical fiber or wavelength to deactivate protection resources between nodes common to two or more optical rings. This may include for example bidirectional line switched ring (BLSR) configurations.

According to a broad aspect, the invention can be applied to deactivate physical working fibers as well as working channels or wavelengths provisioned on a physical working fiber. For clarity, the term fiber is hereinafter used to denote both a physical fiber and a channel or wavelength provisioned on a physical fiber.

In a preferred embodiment, the invention is incorporated in a BLSR network formed of a series of interconnected optical rings to deactivate protection fibers or channels between nodes common to two or more optical rings. According to the preferred embodiment, a common protection path is defined between each pair of common nodes whereby only one protection fiber or channel is used to provide protection for two or more optical rings supported there between. As a result, any other protection fiber or channel and associated connecting equipment present there between can be deactivated.

With the sharing of a protection fiber or channel on spans interconnecting common nodes, the present invention advantageously provides substantial fiber capacity savings by eliminating the need for multiple protection paths and associated connecting equipment on these spans. According to the invention, the protection fibers and associated equipment deactivated can be removed or alternatively re-provisioned to provide a cost-effective and efficient allocation of the protection resources available in the network.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

The present invention consists of a method of deactivating protection fiber resources in an existing optical network with interconnected rings. The invention uses 1:N protection principles to provide a single protection path on spans interconnecting nodes common to two or more optical rings in the network. With the sharing of a protection path on these spans, the present invention advantageously eliminates the need for multiple protection fibers and connecting equipment. According to the invention, the unused protection fibers and equipment can be removed or alternatively re-provisioned to provide a cost-effective and efficient allocation of the resources available in the network.

The invention can also be used to deactivate protection channels or wavelengths provisioned in the same or different fibers. For the purpose of example, only the deactivation of protection fibers and associated connecting equipment will be hereinafter described. For clarity and generality, the term "fiber" as used in the description of the preferred embodiments provided below denotes a physical fiber or a channel/wavelength provisioned on a physical fiber.

The invention can be used in any optical network or system with nodes common to two or more optical rings and interconnected. This may include for example bidirectional line switched ring (BLSR) configurations. For simplicity however, the present invention will only be described in relation to BLSR configurations.

Figure 1:
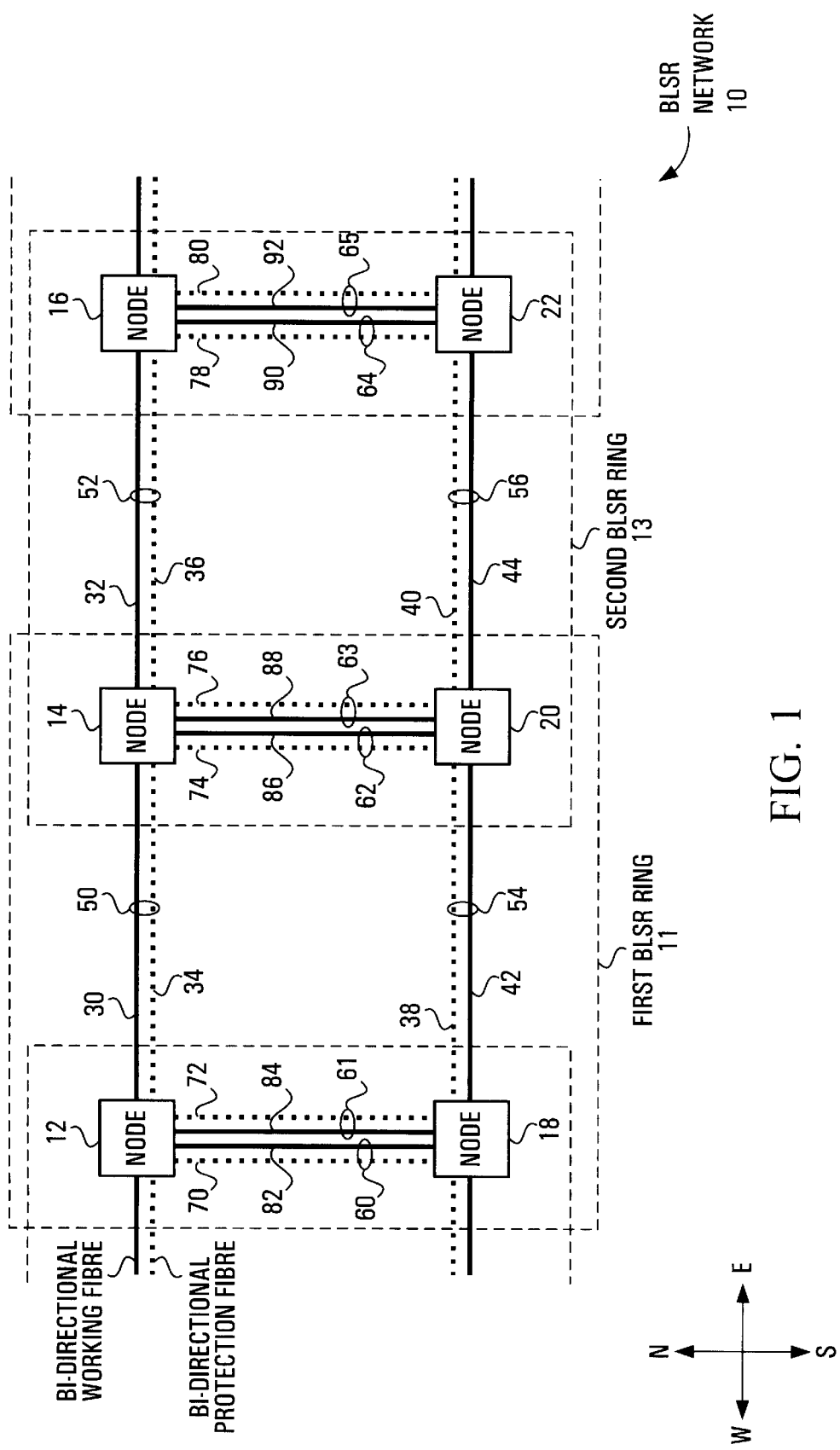
FIG. 1 is a diagram of a conventional four-fiber bidirectional line switched ring (BLSR) network featuring a plurality of protection fibers.

An example of a conventional BLSR optical network with which the invention can be used is shown in FIG. 1 generally denoted by 10. The BLSR network 10 consists of multiple rings interconnected at common nodes 12, 14, 16, 18, 20, 22 connected to form a series of interworking rings. For the purpose of example, FIG. 1 only shows two complete rings where a first ring 11 is formed of nodes 12, 14, 16, 18 and a second ring 13 is formed of nodes 14, 16, 20, 22. The nodes 12, 14, 16, 18, 20, 22 are interconnected with a number of bidirectional East-West and North-South fiber spans which can provide working and protection transport between the nodes 12, 14, 16, 18, 20, 22.

More specifically, the nodes 12, 14, 16 are interconnected with bidirectional East-West fiber spans 50, 52 where each East-West fiber span 50, 52 consists of a bidirectional working fiber 30, 32 (shown as a full line) and a bidirectional protection fiber 34, 36 (shown as a dotted line). Similarly, the nodes 18, 20, 22 are interconnected with bidirectional East-West fiber spans 54, 56 each formed of a bidirectional working fiber 42, 44 (full line) and a bidirectional protection fiber 38, 40 (dotted line).

The nodes 12, 14, 16 are respectively interconnected with the nodes 18, 20, 22 with a number of North-South fiber spans. More specifically, node 12 is interconnected with node 18 with a first pair of North-South fiber spans 60, 61. Between these nodes 12, 18, the span 61 provides North-South connectivity for traffic circulating in ring 11 while the span 60 provides connectivity for traffic circulating in an adjacent ring (not shown). Similarly, node 14 is interconnected with node 20 via a second pair of North-South fiber spans 62, 63 and node 16 is interconnected with node 22 with a third pair of North-South fiber spans 64, 65 where each span provides North-South connectivity for a particular ring. Each North-South fiber span 60, 61, 62, 63, 64 and 65 consists of a bidirectional working fiber 82, 84, 86, 88, 90, 92 (full line) and a bidirectional protection fiber 70, 72, 74, 76, 78, 80 (dotted line).

In the BLSR network 10, the bidirectional working and protections fibers described above with respect to the East-West fiber spans 50, 52, 54, 56 and the North-South fiber spans 60, 61, 62, 63, 64, 65 each consists of a pair of unidirectional physical fibers or channels. Therefore, on each span 50, 52, 54, 56, 60, 61, 62, 63, 64, 65, four unidirectional physical fibers or channels are used. It is to be understood that this is merely an example. If necessary, the BLSR network 10 could be designed with a different configuration to meet different capacity demands. For example, the BLSR network could be designed with additional physical fibers or wavelengths on each span 50, 52, 54, 56, 60, 61, 62, 63, 64, 65 to meet higher channel capacity requirements. Conversely, a two-fiber BLSR configuration could be used where each span 50, 52, 54, 56, 60, 61, 62, 63, 64, 65 is implemented using a single bidirectional fiber for both working and protection bandwidth. In the following description and for the purpose of example only, the BLSR network 10 is assumed to be a four-fiber network.

In the BLSR network 10, traffic is typically routed with standard network management applications such as the well-known integrated network management (INM). For the purpose of example, it is hereinafter assumed that the network management application used in the BLSR network 10 to route traffic is INM.

INM provides the necessary functionality to route traffic around the BLSR network 10. In the absence of failures, INM manages the routing of working traffic between the nodes 12, 14, 16, 18, 20, 22 along the East-West working fiber 30, 32, 42, 44 and the North-South working fibers 82, 84, 86, 88, 90, 92 present in the network 10. As is conventional, a localized controller present at each node 12, 14, 16, 18, 20, 22 supports the protection capabilities of span and ring switches redirecting traffic around failures. In the event of a failure or degradation of a working fiber, the nodes 12, 14, 16, 18, 20, 22 can enter a span switching mode to redirect traffic away from the fault and prevent a service outage. In this mode, the interrupted traffic is redirected from the defective working fiber onto a protection fiber available between the affected nodes 12, 14, 16, 18, 20, 22 thereby maintaining service for all terminating (span) and pass-through (ring) traffic. If a fault affects an entire fiber span between any two adjacent nodes 12, 14, 16, 18, 20, 22 (e.g. a node failure or a cable cut of both working and protection fibers in the fiber span), the affected traffic can be re-directed around the network 10 by ring protection switching.

In the BLSR network 10, each ring 11, 13 must have separate and distinct protection capabilities with a dedicated protection path on each of their respective spans. More specifically, in ring 11, each constituent span 50, 54, 61, 62 is provisioned with a protection fiber 34, 38, 72, 74. Similarly, in ring 13, the spans 52, 56, 63, 64 are also each provisioned with one protection fiber 36, 40, 76, 78.

However, this requirement does not provide an efficient and cost-effective allocation of the protection resources available in the network 10. Between nodes common and supporting two or more rings (hereinafter referred to as "common nodes"), a distinct protection fiber must be used for each ring. For example, between common nodes 14 and 20, two protection fibers 74 and 76 must be used to provide a separate protection path for each ring 11, 13. Similarly, two protection fibers 70, 72 or 78, 80 are used to provide distinct ring protection paths between common nodes 12 and 18 or between nodes 16 and 22.

To obtain better bandwidth efficiency and contain costs, it is possible to reduce the number of protection fibers used between common nodes 12, 18, 14, 20 and 16, 22 while maintaining adequate protection for each ring 11, 13. According to the invention, a common protection path can be defined between each pair of common nodes 12, 18, 14, 20 and 16, 22 whereby only one protection fiber is used to provide protection for the rings supported there between. In order to provide a common protection path between each pair of nodes 12, 18, 14, 20 and 16, 22, the invention takes advantage of the fact that each pair of nodes 12, 18, 14, 20 and 16, 22 is common to two rings ring (e.g. rings 11, 13). Although common nodes are not essential to the invention, they make the control aspects of the single protection path more practical.

By sharing a single protection fiber between each pair of nodes 12, 18, 14, 20 and 16, 22, the other protection fiber(s) and associated connecting equipment present there between can be deactivated. Between the common nodes 14 and 20 for example, a common protection path can be defined on the protection fiber 76 for both ring 11 and ring 13. With this common protection path, the protection fiber 74 and connecting equipment can be deactivated. Alternatively, it is also possible to provision the protection fiber 74 as a common protection path between the nodes 14, 20 and deactivate from use the protection fiber 76 and equipment.

According to the invention, the deactivated protection fiber and associated equipment between the nodes 14 and 20 can be removed or alternatively re-provisioned for use in other network configurations. For example, if only the protection fiber 76 is used between the nodes 14 and 20, it is possible to remove the unused protection fiber 74 and its associated connecting equipment. Alternatively, it is possible to maintain and re-provision the unused protection fiber 74 and equipment for use in other network configurations. Re-provisioning unused protection fibers and associated equipment would maximize the full capacity of the equipment bay by not leaving any slots vacant therein which could otherwise be used for other purposes in the same or other network configurations.

In addition to deactivating a protection fiber and associated equipment between the nodes 14 and 20, it is also possible to deactivate protection fibers and equipment between the nodes 12 and 18 or between the nodes 16 and 20. For the purpose of example, the following description is restricted to the deactivation of the protection fiber 74 and associated equipment between the nodes 14 and 20. It is understood however that this description also applies to the deactivation of protection fibers and equipment between the nodes 12 and 18, and between the nodes 16 and 22.

Figure 2:
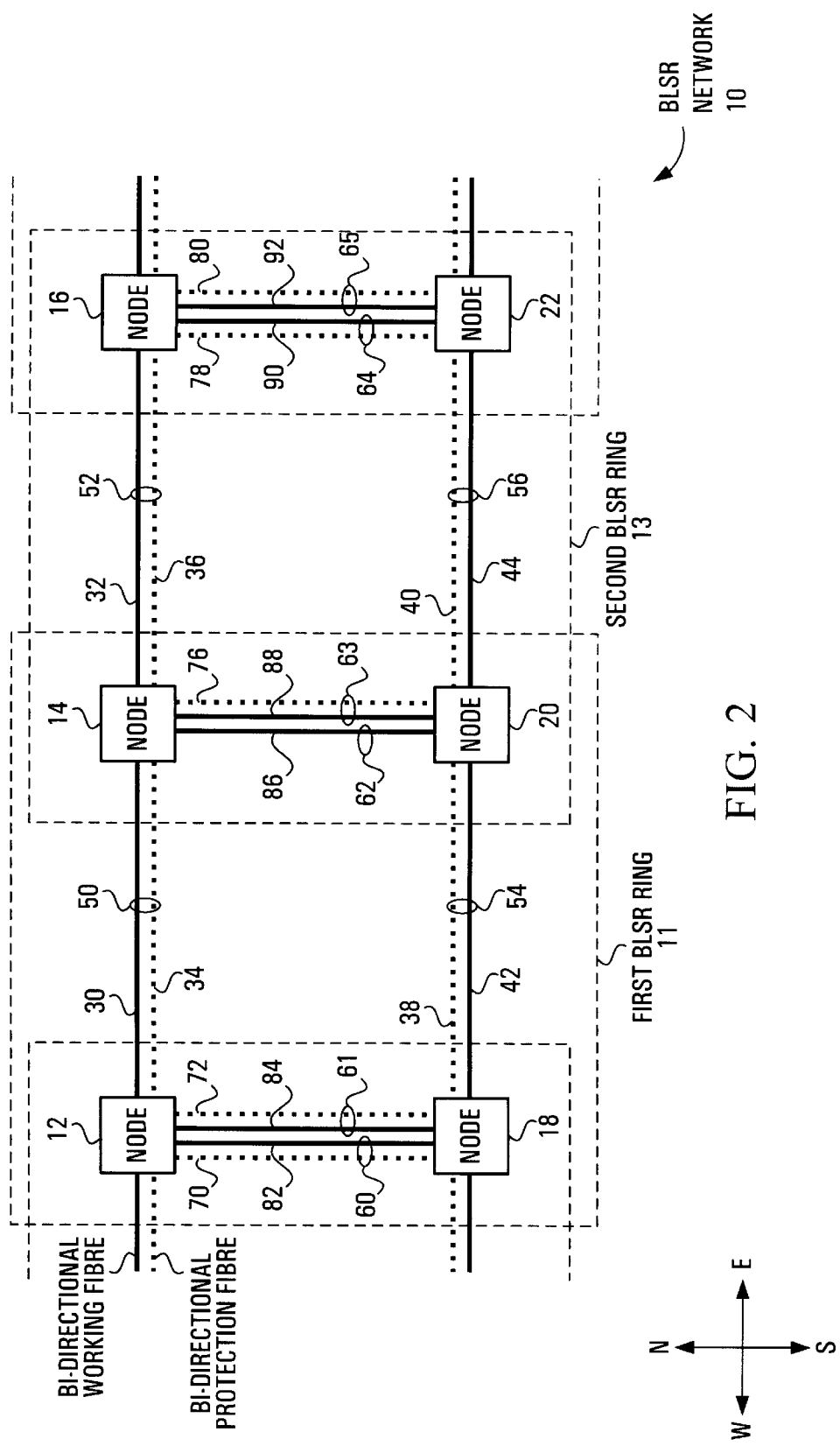
FIG. 2 is a diagram of the four-fiber BLSR network of FIG. 1 with a reduced plurality of protection fibers according to a preferred embodiment of the invention.

FIG. 2 illustrates as an example the network 10 of FIG. 1 where the protection fiber 74 of span 62 and its respective connecting equipment (not shown) have been deactivated and removed. In order to deactivate the protection fiber 74 and associated connecting equipment, a common protection path is defined on the protection fiber 76 to serve the protection requirements of both ring 11 and ring 13. By sharing the protection fiber 76 between ring 11 and ring 13, the protection fiber 74 and associated equipment become unnecessary and as a result, can be deactivated for removal or reprovisioning.

According to the invention, the common protection path is implemented by operating each node 14, 20 terminating the protection fibers 74 and 76 in a 1:N protection mode. In this particular mode, the nodes 14, 20 operate to determine which of the protection fibers 74, 76 is to be used for the common protection path. Once a determination has been made that, for example, the protection fiber 76 is to be used, the nodes 14, 20 function to arbitrate the common protection path usage required by the rings 11, 13.

More specifically, the 1:N protection mode will cause the nodes 14, 20 to consider requests for protection (i.e. span and ring switch requests) from both rings 11, 13 and allocate the protection fiber 76 on a priority basis. According to the invention, the protection requests issued by the rings 11, 13 are assigned different priorities so that the nodes 14, 20 can decide the order in which they should be serviced.

When issuing protection requests, each ring 11, 13 follows a ring priority assignment as with any standard ring network configuration. In addition to this however, the protection requests issued by each ring 11, 13 must also have assigned different "inter-ring" priorities so that the nodes 14, 20 can arbitrate requests of equal priority received from both rings 11, 13. For example, requests received from ring 11 could be assigned a priority lower than that assigned to ring 13 requests. Alternatively, requests from ring 13 could be assigned a priority lower than that assigned to requests from ring 11. The manner in which protection requests issued by the rings 11 and 13 can be assigned different priorities would be obvious to a person skilled in the art and is not described here in any detail.

In order to appropriately allocate the protection fiber 76, the nodes 14, 20 evaluate protection requests received from the rings 11, 13 on an intra-ring basis to establish the requests priorities within each ring 11, 13. In addition, the nodes 14, 20 also evaluate the requests received on an inter-ring basis by comparing request priorities of a particular ring 11, 13 with the request priorities of the adjacent ring 11, 13. Once the request priorities have been evaluated, the nodes 14, 20 reach and confirm a request priority agreement that establishes the order in which the protection requests received will be serviced. Based on the request priority agreement reached, the nodes 14, 20 can proceed to allocate the protection fiber 76.

According to the invention, various protocols can be used to establish and confirm request priority agreements between the nodes 14, 20. Preferably, the protocols already used in the rings 11, 13 should both be extended through the protection fiber 76 for priority agreements. For this, bandwidth could be pre-allocated on the protection fiber 76 to support these two protocols. If for example K-bytes protocols are used in the rings 11, 13, bandwidth could be pre-allocated on the protection fiber 76 to extend the use of K-bytes across the fiber 76 for priority agreements between the nodes 14, 20. In this example, the nodes 12, 14, 16, 18, 20, 22 of each ring 11, 13 would see the K-bytes as they normally would with both protection fibers 74, 76 present.

However, in order to support both ring protocols across the single protection fiber 76, it may be necessary to use bandwidth from different sources. For example, the synchronous optical network (SONET)/synchronous digital hierarchy (SDH) standard has defined an overhead which only allocates sufficient protocol bandwidth for one set of K-bytes. The additional protocol bandwidth necessary to support another set of K-bytes could be allocated by using other existing functionality in the SONET/SDH overhead or from subsequent synchronous transport signal (STS) line overhead which is otherwise unused. For example, the other set of K-bytes could be supported by unused functionality in subsequent STSs in an optical SONET or SDH signal.

By enabling the 1:N protection mode in the nodes 14, 20, only the protection fiber 76 is used for protection between the nodes 14, 20 and as a result, the protection fiber 74 and associated equipment can be deactivated. Once deactivated, the fiber 74 can then be disconnected and removed or re-provisioned. Similarly, the connecting equipment associated with the fiber 74 which typically includes circuit packs can be also be removed or re-provisioned for use in alternative network configurations.

According to the invention, the 1:N mode should preferably be defined to automatically disable any alarm activated in relation to missing equipment. For example, the 1:N mode should be defined to automatically disable circuit pack missing alarms which may be activated when the fiber connecting equipment is removed. Further enhancements and precautionary interlocks are also possible. For example, it should not be possible to enable the 1:N mode if lockouts of any type or protection switches are in force on the ring 11 in which the protection fiber 74 is to be removed.

In addition to deactivating protection fibers and associated equipment to obtain better bandwidth efficiency and contain costs, it is also possible to deactivate underutilized working resources on any span in the network 10. For example, if there is little or no traffic on the North-South spans 60, 61, 62, 63, 64, 65, it is possible to deactivate some or all of the working fibers 82, 84, 86, 88, 90, 92 with their respective equipment. It is also possible to deactivate underutilized working fibers and equipment that may be present on any East-West fiber span 50, 52, 54 and 56. Techniques to deactivate underutilized working resources can be found in co-pending US patent application entitled "Method of deactivating working fiber resources in optical ring networks" and filed on the same day in the name of Peter W. Phelps, et al. The disclosure of this patent application is incorporated herein by reference.

While the invention has been described above with reference to a particular network topology, further modifications and improvements to support other network configurations which will occur to those skilled in the art, may be made within the purview of the appended claims, without departing from the scope of the invention in its broader aspect.

In particular, the invention has been described above with respect to BLSR configurations. It is understood that the invention is not restricted to BLSR networks. The manner in which the invention could be applied to other ring configurations would be obvious to a person skilled in the art and is not described here in any detail.

Further, the invention has been described above in relation to the deactivation of protection fibers between common nodes. It is to be understood that the invention is not restricted thereto and can also be used in relation to the deactivation of protection channels in the same or different fibers. If for example, a single protection fiber has defined separate channels to protect separate rings, the invention could be used to provision a single channel as a common protection path and deactivate the other remaining channels and associated connecting equipment. In this case, the protection fiber would remain in use to support the common protection channel but the connecting equipment associated with the unused channels could be removed or re-provisioned as previously described.

We claim:

1. A method of deactivating a protection fiber interconnecting a first and a second node in an optical network comprised of a plurality of nodes interconnected to form a series of interconnected optical rings, the protection fiber defining between the first and second nodes a first protection path for a first optical ring, the first and second nodes being interconnected with another protection fiber defining between the first and second nodes a second protection path for a second optical ring, the method comprising at each of the first and second nodes:

provisioning a common protection path on the other protection fiber for protection in the first and second optical rings;

arbitrating usage of the common protection path provisioned between the first and second optical rings; and disconnecting the protection fiber.

2. The method of claim 1 wherein provisioning a common protection path on the other protection fiber for protection in the first and second optical rings is done by activating a 1:N protection mode.

3. The method of claim 2 wherein arbitrating usage of the protection path provisioned between the first and second optical rings comprises servicing protection requests received from the first and second optical rings on a priority basis.

4. The method of claim 3 wherein for servicing protection requests received from the first and second optical rings on a priority basis, each protection request has been assigned a different intra-ring and inter-ring request priority.

5. The method of claim 4 wherein servicing protection requests received from the first and second optical rings on a priority basis comprises:

evaluating request priorities of the protection requests received on an intra-ring basis;

evaluating request priorities of the protection requests received on an inter-ring basis;

determining between the first and second nodes a request priority assignment establishing the order in which the protection requests received are to be serviced; and servicing the protection requests received based on the request priority assignment determined.

6. The method of claim 5 wherein determining between the first and second nodes a request priority assignment establishing the order in which the protection requests received are to be serviced is done over the other protection fiber using existing ring protocols.

7. The method of claim 6 wherein the ring protocols are K-bytes ring protocols.

8. The method of claim 1 wherein provisioning a common protection path on the other protection fiber for protection in the first and second optical rings is done when no protection switch is in effect in the optical network.

9. The method of claim 8 wherein disconnecting the protection fiber is done when the protection fiber does not carry any traffic.

10. The method of claim 9 further comprising removing the protection fiber.

11. The method of claim 9 further comprising provisioning the protection fiber for use in another optical network.

12. The method of claim 9 wherein the first and second nodes are each connected to the protection fiber with respective fiber connecting equipment, the method further comprising deactivating at each of the first and second nodes the corresponding fiber connecting equipment.

13. The method of claim 12 further comprising removing at each of the first and second nodes the corresponding fiber connecting equipment.

14. The method of claim 13 further comprising disabling at each of the first and second nodes missing alarms associated with the corresponding fiber connecting equipment.

15. The method of claim 14 wherein at each of the first and second nodes, the corresponding fiber connecting equipment comprises line circuit packs.

16. The method of claim 12 further comprising provisioning at each of the first and second nodes the corresponding fiber connecting equipment for use in another optical network.

17. The method of claim 9 wherein provisioning a common protection path on the other protection fiber for protection in the first and second optical rings is done with a network management tool.

18. The method of claim 9 wherein the optical network is a bidirectional line switched ring (BLSR) network.

19. A method of deactivating a protection channel between a first and a second node in an optical network comprised of a plurality of nodes interconnected to form a series of interconnected optical rings, the protection channel defining between the first and second nodes a first protection path for a first optical ring, the first and second nodes being interconnected with another protection channel defining between the first and second nodes a second protection path for a second optical ring, the method comprising at each of the first and second nodes:

provisioning the other protection channel as a common protection path between the first and second nodes for protection in the first and second optical rings;

arbitrating usage of the common protection path provisioned between the first and second optical rings; and disabling the protection channel.

20. The method of claim 19 wherein provisioning the other protection channel as a common protection path between the first and second nodes for protection in the first and second optical rings is done by activating a 1:N protection mode.

21. The method of claim 20 wherein arbitrating usage of the protection path provisioned between the first and second optical rings comprises servicing protection requests received from the first and second optical rings on a priority basis.

22. The method of claim 21 wherein for servicing protection requests received from the first and second optical rings on a priority basis, each protection request has been assigned a different intra-ring and inter-ring request priority.

23. The method of claim 19 wherein provisioning the other protection channel as a common protection path between the first and second nodes for protection in the first and second optical rings is done when no protection switch is in effect in the optical network.

24. The method of claim 23 wherein disabling the protection channel is done when the protection channel does not carry any traffic.

25. The method of claim 24 wherein the protection channel and the other protection channel are located on a single protection fiber.

26. The method of claim 25 wherein the first and second nodes have fiber connecting equipment for connecting to the protection channel and to the other protection channel, the method further comprising deactivating at each of the first and second nodes the fiber connecting equipment connecting to the protection channel.

27. The method of claim 26 further comprising removing at each of the first and second nodes the fiber connecting equipment connecting to the protection channel.

28. The method of claim 27 further comprising disabling at each of the first and second nodes missing alarms associated with the fiber connecting equipment removed.

29. The method of claim 28 wherein at each of the first and second nodes, the fiber connecting equipment removed comprises line circuit packs.

30. The method of claim 26 further comprising provisioning at each of the first and second nodes the fiber connecting equipment connecting to the protection channel for use in another optical network.

31. The method of claim 24 wherein provisioning the other protection channel as a common protection path between the first and second nodes for protection in the first and second optical rings is done with a network management tool.

32. The method of claim 24 wherein the optical network is a BLSR network.

33. A network node adapted to implement the method of claim 1.

34. A network node adapted to implement the method of claim 19.

* * * * *